United States Patent [19]
Thrush

[11] Patent Number: 5,692,144
[45] Date of Patent: Nov. 25, 1997

[54] METHOD AND SYSTEM FOR DEPICTING AN OBJECT SPRINGING BACK FROM A POSITION

[75] Inventor: James Marion Thrush, Bellevue, Wash.

[73] Assignee: Microsoft Corporation, Redmond, Wash.

[21] Appl. No.: 510,911

[22] Filed: Aug. 3, 1995

[51] Int. Cl.$^6$ .................................................. G06F 3/14
[52] U.S. Cl. .................. 395/339; 395/977; 395/174; 395/348
[58] Field of Search ................ 395/339, 348, 395/349, 977, 173, 174, 175; 345/122; 463/3, 31, 32

[56] References Cited

U.S. PATENT DOCUMENTS

| | | | |
|---|---|---|---|
| 4,006,474 | 2/1977 | Lukkarila | 463/3 |
| 5,303,388 | 4/1994 | Kreitman et al. | 395/348 |
| 5,359,703 | 10/1994 | Robertson et al. | 395/174 |
| 5,371,844 | 12/1994 | Andrew et al. | 395/348 |

Primary Examiner—Raymond J. Bayerl
Assistant Examiner—Cao H. Nguyen
Attorney, Agent, or Firm—Jones & Askew, LLP

[57] ABSTRACT

A method and system for depicting an object springing back along a travel path from an initial position to oscillate about and ultimately rest at a resting position. A travel path for the object towards the resting position is selected. A bounce position on the travel path is determined. After a time interval, the object is displayed in the bounce position. If the object is outside a predetermined distance of the resting position or has a velocity greater than a predetermined value, another travel path is selected and a subsequent bounce position on that travel path is determined. The object then is displayed in the subsequent bounce position. The travel path selection, bounce position determination and object display in the determined bounce position are repeated until a user interrupts or until the object appears to come to a rest in the resting position.

17 Claims, 9 Drawing Sheets

MILK PRODUCTS

CAN YOU MATCH EACH MILK PRODUCT TO THE DESCRIPTION OF HOW IT IS MADE? CLICK ON THE BUCKETS TO READ THE DESCRIPTIONS. THEN DRAG EACH BUCKET TO THE CORRECT MILK PRODUCT.

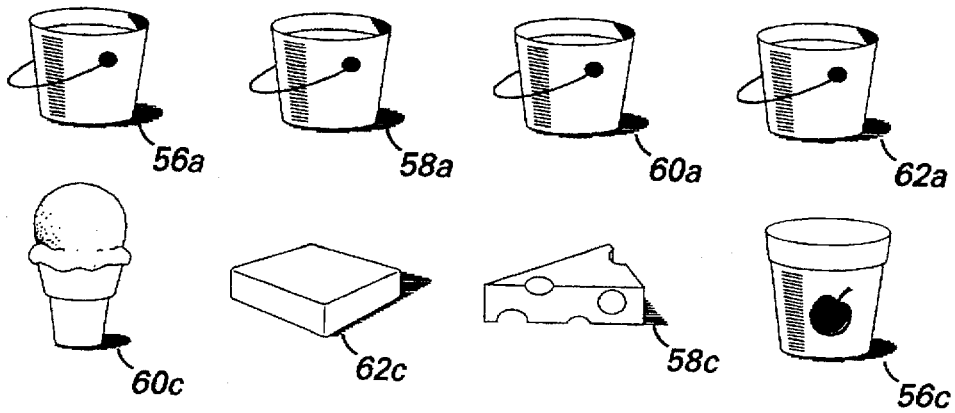

MILK, CREAM, SUGAR AND FLAVORING ARE BLENDED, PASTEURIZED, AND HOMOGENIZED. THE MIXTURE IS THEN POURED INTO A VERY COLD TANK AND WHIPPED UNTIL SMOOTH. FINALLY, IT IS PACKED INTO CONTAINERS AND CHILLED EVEN MORE.

A SUBSTANCE CALLED *RENNIN* IS ADDED TO SOUR MILK TO PRODUCE A THICK CURD. THE CURD IS SEPARATED FROM THE WHEY, OR LIQUID PART OF THE MILK, AND THEN SALTED AND PRESSED INTO SHAPE. IN MOST CASES, THE CURD IS THEN STORED TO LET IT RIPEN. THIS PROCESS PRODUCES A HIGH-PROTEIN FOOD THAT COMES IN A VARIETY OF FLAVORS, TEXTURES, AND COLORS.

FLAVORING AND TWO KINDS OF BACTERIA ARE ADDED TO CONCENTRATED MILK. AFTER THE MIXTURE FERMENTS, IT IS CHILLED, AND FRUIT AND SUGAR ARE OFTEN ADDED.

CREAM IS SEPARATED FROM MILK AND PLACED IN A CHURN, WHERE IT IS STIRRED CONSTANTLY WITH A PADDLE UNTIL THE FAT BECOMES SOLID. SALT AND COLORING ARE SOMETIMES ADDED. AFTER CHURNING, THE LEFTOVER MILK IS DRAINED AWAY.

FIG.2

MILK PRODUCTS ⟵ 52
CAN YOU MATCH EACH MILK PRODUCT TO THE DESCRIPTION OF HOW IT IS MADE? CLICK ON THE BUCKETS TO READ THE DESCRIPTIONS. THEN DRAG EACH BUCKET TO THE CORRECT MILK PRODUCT. ⟵ 54
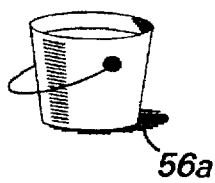
56a
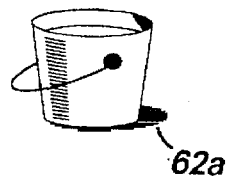
62a
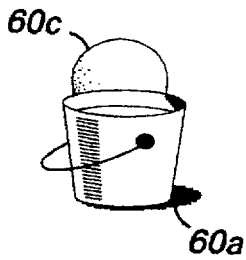
60c
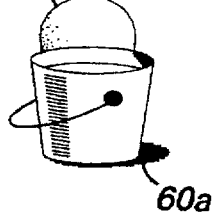
60a
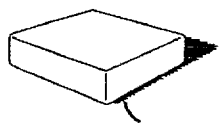
62c
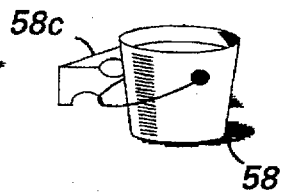
58c   58
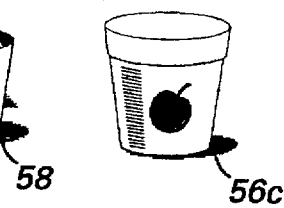
56c
FIG. 3

METHOD AND SYSTEM FOR DEPICTING AN OBJECT SPRINGING BACK FROM A POSITION

TECHNICAL FIELD

The present invention relates to the field of computer systems, and in particular, relates to a method and system for depicting an object springing back from an initial position to oscillate about and ultimate rest in a resting position.

BACKGROUND OF THE INVENTION

"Error! Error!" With this imperative announcement, the computer based robot alerted the space travelling crew (and especially Dr. Smith) of the 1960's television series "LOST IN SPACE" to the error of their ways. Although this error message was entertaining to television viewers and informative to the fictional crew, the error message did little to promote the educational or entertainment experience of the person interacting with the computer robot. We have not yet reached the age of personal computer robots, but personal computers are here. From eight months to eighty, people of all ages are using computers at home, in school and at work. Moreover, computers are being used for all sorts of purposes including business, education and entertainment. Yet, human errors in using a program or otherwise interacting with a computer often are met with discouraging feedback such as the "Error! Error!" message.

Although we do not yet have a personal computer robot to help us, human errors are minimized and a person's use of a computer is made easier through the use of a computer screen display format commonly referred to as a graphical user interface (GUI). A graphical user interface operates as part of and as an interface to a computer's operating system, and to application programs running in conjunction with the operating system. The graphical user interface displays graphic images including text, entities, files, folders, icons and so forth on the computer screen. These graphic images represent computer objects that can be readily manipulated by the user for easy interaction with the computer. In particular, a graphic image functions as a visual metaphor of the represented operation. A graphic image generally can be manipulated by the user so as to accomplish the represented computer operation without the entry of a typed command. As a result, through the use of graphic images, a graphical user interface provides a relatively simple and intuitive means for operating a computer system. As such, a graphical user interface goes a long way towards making the operation of a computer user-friendly.

To accomplish a particular computer operation, the user typically interacts with the graphical user interface by positioning a cursor over a graphic image that represents the particular operation. The cursor generally is positioned by means of a pointing device commonly referred to as a mouse, or other input device. With respect to a mouse, a roller ball on the underside of the mouse generates directional commands as the mouse is moved by the user. The mouse movement is then translated by the operating system into movement of the cursor on the screen. Thus, the user's movement of a mouse results in movement of the cursor on screen.

A user selects a particular graphic image by positioning the cursor over the image and clicking a button on the mouse. To launch or open an operation or object represented by the selected graphic image, the user double-clicks the mouse button. To perform other functions with respect to the chosen operation or object, the selected graphic image may have to be moved to a different part of the display screen. To move a graphic image, the user follows a process that is commonly referred to as "dragging and dropping" or just "dragging". To move the graphic image, the user uses the mouse to position the cursor over the graphic image. The user clicks the mouse button and holds the button in a down position while moving the mouse so that the cursor and the object are moved to a different position on the screen. Once the object has been moved by this process to the desired different location, the user releases the mouse button and the object is left at the new location.

Certain computer programs, especially educational and entertainment programs, are designed to promote levels of user interaction higher than just using a mouse to drag graphic images on the display screen. This user interaction significantly augments the educational or entertainment experience of the person using the program. In the case of educational programs, user interaction stimulates interest and extended participation with the program on the part of the student using the program. Increased interest and extended participation clearly add to the student's learning process. In contrast, the lack of user interaction minimizes the educational or entertainment benefits of a program. The user is treated as a mere observer whose educational or entertainment experience is minimized as a result of being left sitting on the metaphorical sidelines.

One method to promote user interaction with a computer program is to involve the user in moving graphic images around the display screen during the course of the program. For example, an educational program typically engages a student to interact with the program by posing one or more questions. These questions are displayed on the screen through the use of graphic images sometimes including text and/or auditory enhancements. In certain prior art systems, a possible answer to a question or possible solution to a problem or task also is displayed on the screen through the use of a graphic image. The student interacts with the program by selecting the graphic image representing the answer and moving it from its resting location on the display screen to a specified position on the display screen, where the answer is released. A correct answer typically snaps into place in the specified position. For example, a math program may display the arithmetical question: "2+2=?" The program also displays the numeral "4" somewhere in a resting position on the screen. To answer the question, the student clicks on the "4" and drags it from its resting position and releases the "4" at the position held by the question mark. The numeral "4" snaps into place so that the following statement appears: "2+2=4".

Often, an educational program displays more than one possible answer to a posed question. In this way, the student is stimulated to think about the possible range of answers. The student answers the question by choosing one of the possible answers, dragging it from its resting position and releasing it at a specified position on the display screen. As noted above, if the student's choice for an answer is correct, typically the answer snaps into place. For example, the math program displays the arithmetical question: "2+2=?" and displays three different possible answers: "3"; "4"; and "5". Our clever student chooses "4" as the correct answer, drags the "4" from its resting position and releases the "4" at the position held by the question mark. As before, the numeral "4" snaps into place so that the following statement appears: "2+2=4".

However, to err is human. Typically, if an incorrect answer is dragged from its resting position to the specified position on the display screen, the incorrect answer does not snap into place in the specified answer position. Rather, the incorrect answer simply reappears in its resting position. In other words, the incorrect answer snaps back to its resting position without any interaction on the part of the student. The effect of the snap back of the selected answer to its resting position can be surprising and discouraging to the student. The effect can be surprising in a negative way because the snap back of the selected answer generally happens very quickly. The surprise and quickness of the snap back fails to give the student an opportunity to absorb the fact that the choice was incorrect. The student may consider that the program is faulty, and repeat the selection and dragging of the incorrect answer. This repetition simply reinforces the learning of the incorrect answer to the question.

The effect of the snap back of the selected answer can also be discouraging because the snap back fails to provide any satisfactory and positive user interaction with the program. The snap back of the incorrect answer functions akin to a slap on the wrist. The snap back serves to discourage the interest of the student in the program, thereby minimizing the learning experience provided by the program for the student.

Although educational programs have served as our examples in the discussion above, it will be apparent to those skilled in the art that the described problems are common to other types of programs as well.

It is said that we learn more from our mistakes than our successes. Therefore, there is a need in the art for a system and method that allows a person to readily and easily learn from a mistake. There is also a need in the art for a system and method that encourages a user's learning process through satisfactory and positive user interaction with a program. There is a further need in the art for a system and method that stimulates a user's interest in a program and a user's further learning through user friendly graphic images. There is yet a further need in the art for a system and method that provides the user with positive feedback in a learning process. In particular, there is a need in the art for a system and method that provides a user with encouraging, entertaining, thought-provoking feedback to indicate the user's selection of an incorrect answer to a question posed as part of a program.

SUMMARY OF THE INVENTION

The present invention provides a better solution to the above described problems in the art by providing a system and method for depicting an object springing back from an initial position to oscillate about and ultimately rest in a resting position. The object is depicted by determining a bounce position for the object and displaying the object in the bounce position. In the preferred embodiment, if the object in the bounce position is not located within a predetermined distance of the resting position, another travel path for the object is selected and a subsequent bounce position for the object on that travel path is determined. The object then is displayed in the subsequent bounce position. The travel path selection, bounce position determination and object display in the determined bounce position are repeated until a user interrupts or until the object appears to come to a rest in the resting position.

In the preferred embodiment, after the spring back process is initiated, the process waits a predetermined interval. Thereafter, the bounce position for the object is determined. Preferably, the bounce position of the object is determined so as to best reflect a spring back motion for the object. Thus, the preferred embodiment takes into account the path of travel of the object during the spring back motion and the object's apparent velocity towards a resting position. After determination of the bounce position, the object is displayed in that position. A check is made to determine whether the spring back process is to be interrupted. If the process is to be interrupted, the process ends with the depiction of the object in the resting position. If the process is not to be interrupted, then a check is made of certain factors whether the object may be displayed in the resting position. If so, the process ends with the depiction of the object in the resting position. If not, the process repeats beginning with the waiting interval.

The depiction of an object springing back from an initial position to oscillate about and ultimately rest in a resting position is useful in connection with many computer programs, and in particular, in connection with educational and entertainment programs. Specifically, the spring back process can be used to provide the user with positive feedback which acknowledges an error on the part of the user in interacting with a program. The spring back process provides the user with a fun visual reward even though the user has made an error. The spring back process stimulates the interest of the user and encourages extended participation and experimentation with the program. In this fashion, the educational and entertainment benefits to the user are maximized.

Therefore, it is an object of the present invention to provide an improved system and method that allows a person to readily and easily learn from a mistake.

It also is an object of the present invention to provide an improved system and method that encourages a user's learning process through satisfactory and positive user interaction with a program.

In addition, it is an object of the present invention to provide an improved system and method that stimulates a user's interest in a program and a user's further learning through user friendly graphic images.

It is a further object of the present invention to provide an improved system and method that provides the user with positive feedback in a learning process.

In particular, it is an object of the present invention to provide an improved system and method that provides a user with encouraging, entertaining, thought-provoking feedback to indicate the user's selection of an incorrect answer to a question posed as part of a program.

Finally, it is an object of the present invention to provide an improved system and method for depicting an object springing back from a position.

That the present invention and the preferred embodiment thereof overcome the drawbacks set forth above and accomplish the objects of the invention set forth herein will become apparent from the detailed description of the preferred embodiment to follow.

BRIEF DESCRIPTION OF THE DRAWING

FIG. 2 illustrates a screen display of an illustrative question-answer session of a computer program of a type with which the preferred embodiment of the present invention interacts.

FIG. 3 illustrates another screen display of the exemplary question-answer session shown in FIG. 2.

DETAILED DESCRIPTION

Figure 1:
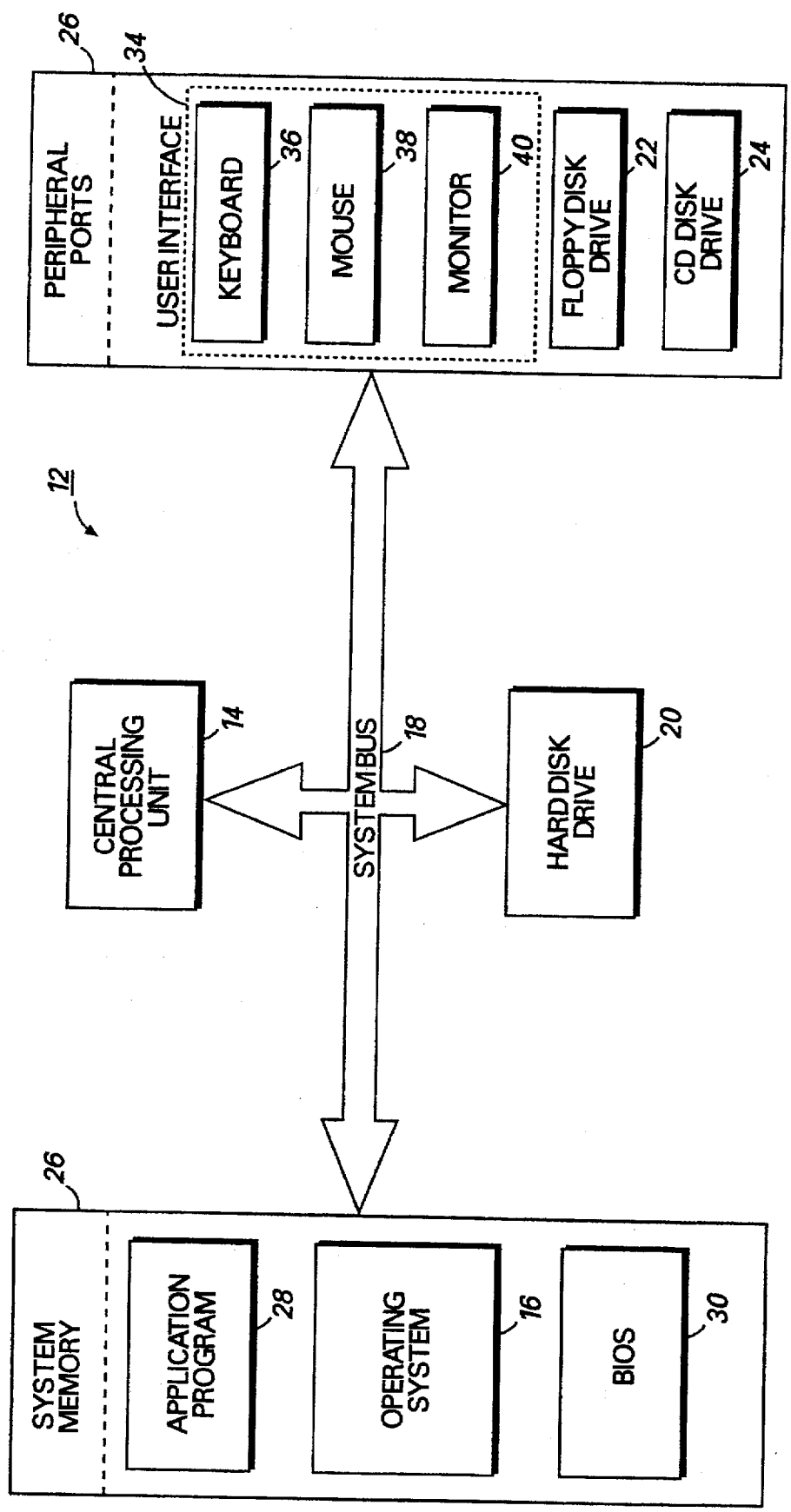
FIG. 1 is a block diagram of the components of a computer system used in connection with the preferred embodiment of the present invention.

Turning first to the nomenclature of the specification, the detailed description which follows is represented largely in terms of processes and symbolic representations of operations by conventional computer components, including a central processing unit (CPU) associated with a general purpose computer system, memory storage devices for the CPU, and connected pixel-oriented display devices. These operations include the manipulation of data bits by the CPU and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For purposes of this discussion, a "process" is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared or otherwise manipulated. It is conventional for those skilled in the art to refer to these signals as bits, values, elements, symbols, characters, terms, numbers, records, files or the like. It should be kept in mind, however, that these and similar terms should be associated with appropriate physical quantities for computer operations, and that these terms are merely conventional labels applied to physical quantities that exist within and during operation of the computer.

It also should be understood that manipulations within the computer are often referenced as terms such as adding, comparing, moving, etc. which are terms often associated with manual operations performed by a human operator. It must be understood that no involvement of a human operator is necessary or even desirable in the present invention. The operations described herein are machine operations performed in conjunction with a human operator, or user, that interacts with the computer. The machines used for performing the operation of the present invention, as will be understood, include general purpose digital computers or other similar computing devices.

In addition, it should be understood that the program, processes, methods, etc. described herein are unrelated to or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

Referring now to the drawings, in which like numerals represent like elements throughout the several figures, the present invention and the preferred operating environment will be described.

FIG. 1 is a block diagram of the components of a computer system 12 used in connection with the preferred embodiment of the present invention. The computer system 12 includes a central processing unit (CPU) 14 that operates the computer system 12 in conjunction with a graphical user interface-based operating system 16 to retrieve, process, store, and display data. The CPU 14 typically is implemented as a microprocessor, such as the models 80386 or 80486 manufactured by Intel Corporation, Santa Clara, Calif. The CPU 14 communicates, by means of control, address, and data signals, with the operating system 16 and with the remaining components of the computer system 12 through a system bus 18.

The operating system 16 includes a set of computer programs that control the internal functions of the computer system 12, thereby allowing the computer 12 to run application software. The operating system 16 is installed in a mass storage device, such as a hard disk drive 20, a floppy disk drive 22, a CD disk drive 24, or a ROM chip (not shown). During boot up (initialization) of the computer system 12, the operating system 16 is loaded into a system memory 26.

A computer-implemented application program 28 is also loaded into the system memory 26 from a computer-readable medium such as the hard disk drive 20, the floppy disk drive 22, or the CD disk drive 24. It will be appreciated by those skilled in the art that a system memory also is a computer-readable medium. The application program 28 operates in conjunction with the operating system 16 to provide a graphical user interface.

A basic input/output system (BIOS) program 30 is stored in the system memory 26 along with the operating system 16. The BIOS program 30 supplies the device-level control or support services for the primary input/output devices of the computer during the boot process. After a boot, the BIOS program 30 accepts requests from the application program 28 and from the operating system 16 running on the computer system 12 and performs input/output services as requested by those programs. The functions and operations of conventional BIOS programs are well known and will not be further described herein.

A series of peripheral ports 32 are provided on the system bus 18 for receiving and transmitting data via a user interface 34. The user interface 34 includes a keyboard 36 and an input device for entering data. As used herein, the phrase "input device" means a mouse, trackball, track pad, or any other pointing device for positioning a cursor on a computer screen. In the preferred embodiment, the input device is a mouse 38. Data is graphically displayed by a monitor 40.

The mouse 38 operates in conjunction with a cursor displayed on the monitor 40. The cursor is positioned by means of a roller ball on the underside of the mouse 38. The roller ball generates directional commands as the mouse 38 is moved by the user. That mouse movement is then translated by the operating system 16 into movement of the cursor on the monitor 40. As is well known in the art, a user can select, launch, and move objects by moving and clicking the mouse 38.

In the preferred embodiment, the operating system 16 is the "WINDOWS" operating system manufactured by the assignee of this application, Microsoft Corporation of Redmond, Wash. Those skilled in the art will understand that the invention can be implemented in other graphical user interface operating systems, such as the "OS/2" operating system manufactured by IBM and the "MACINTOSH" operating system manufactured by Apple Computer, Inc.

The preferred application program 28 is the "MICROSOFT EXPLORAPEDIA" program manufactured by Microsoft Corporation. This program 28 includes instructions, which when executed by the computer, performs the steps of the preferred embodiment of the present invention. As will be understood by those skilled in the art, this invention is equally applicable to other application programs that operate in a graphical user interface environment.

We turn now to a description of the method and system of the present invention which comprise the depiction of an object bouncing along a travel path from an initial position towards a resting position. The bouncing object is depicted by determining a bounce position for the object on the travel path and then by displaying the object in the bounce position. In particular, the bounce position is closer to the resting position along the travel path than the initial position. The depiction of the bouncing object is described generally below in connection with its use in an educational program. In particular, the depiction of the bouncing object is described in connection with its use to indicate an incorrect answer to a question posed as part of an educational program.

As noted above, the preferred application program 28 is the "MICROSOFT EXPLORAPEDIA" program, which is an educational and entertainment program designed principally for use by children. FIG. 2 illustrates a screen display of an exemplary question-answer session from the "MICROSOFT EXPLORAPEDIA" program with which the preferred embodiment of the present invention interacts. As illustrated in FIG. 2, the topic 52 of the illustrated question-answer session is "Milk Products". The question 54 posed to the user (student) of the program is as follows:

Can you match each milk product to the description of how it is made? Click on the buckets to read the descriptions. Then drag each bucket to the correct milk product. The screen display further depicts four buckets 56a–62a (presumably filled with milk) and four milk products 56c–60c, respectively: yogurt, cheese, ice cream and butter. If the user clicks on a first of these buckets, for example, bucket 56a, then a window 56b appears which includes the following information:

Flavoring and two kinds of bacteria are added to concentrated milk. After the mixture ferments, it is chilled, and fruit and sugar are often added.

Similarly, if the user clicks on a second bucket, for example, bucket 58a, then a corresponding window 58b appears; if the user clicks on a third bucket, for example, bucket 60a, then a corresponding window 60b appears; and if the user clicks on the fourth bucket, bucket 62a, then a corresponding window 62b appears. Based on the information provided by a particular window, the user responds to the question ("Can you match each milk product to the description of how it is made?) by dragging a bucket to a milk product. If the bucket has been dragged to the correct milk product, the bucket snaps into place over the milk product.

FIG. 3 illustrates another screen display of the illustrative question-answer session shown in FIG. 2. In particular, FIG. 3 illustrates that the user of the program has correctly matched two of the buckets with milk products. The user has correctly matched bucket 58a with cheese 58c as indicated by the bucket 58a covering the cheese 58c. In addition, the user has correctly matched bucket 60a with ice cream 60c as indicated by the bucket 60a covering ice cream 60c.

However, as noted in the background section above, to err is human. If the user had incorrectly matched a bucket to a milk product, then the preferred embodiment of the present invention would have depicted the bucket springing back from from its initial position over the incorrect milk product to a resting position aligned with the other buckets. The use of the term "springing" is used to cover other similar terms such as "bouncing". This depiction of a springing bucket provides the user with a fun visual reward even though the user has mismatched the bucket to an incorrect milk product. The depiction of the springing object (in this case, a bucket) stimulates the interest of the user and encourages extended participation and experimentation with the program. In this fashion, the educational and entertainment benefits to the user are maximized. The details of the depiction of the springing bucket in accordance with the preferred embodiment of the present invention are described below.

Figure 4A:
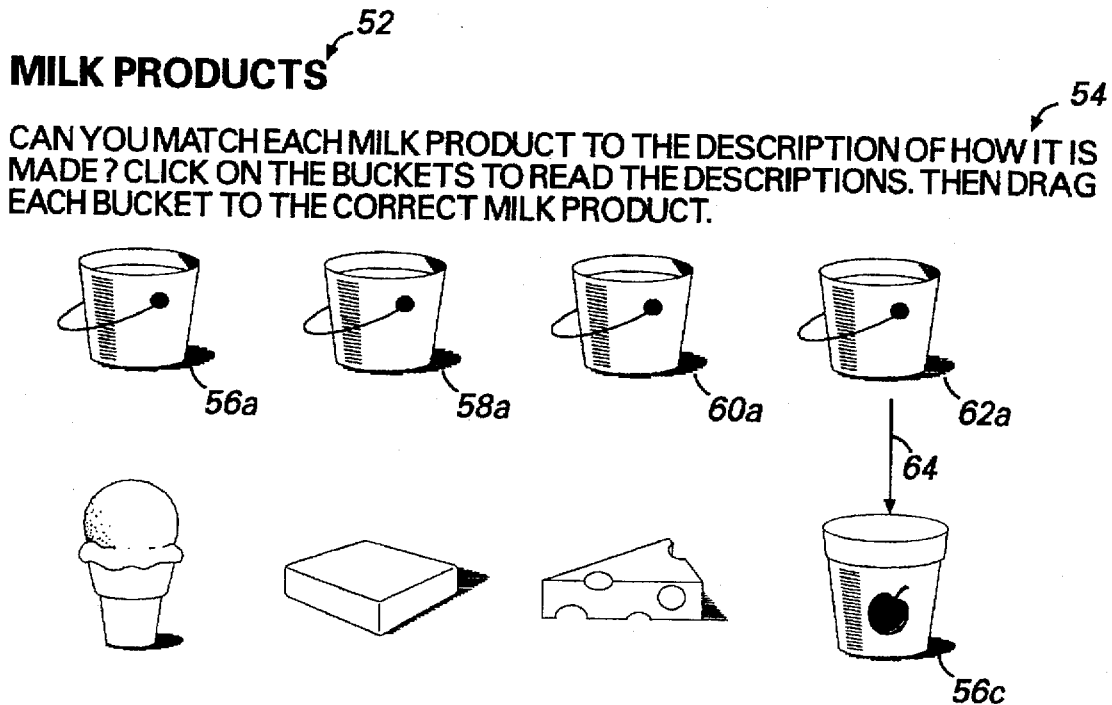
FIGS. 4A–4H illustrate screen displays of the exemplary question-answer session shown in FIG. 2 and further illustrate the preferred embodiment of the present invention.
Figure 4B:
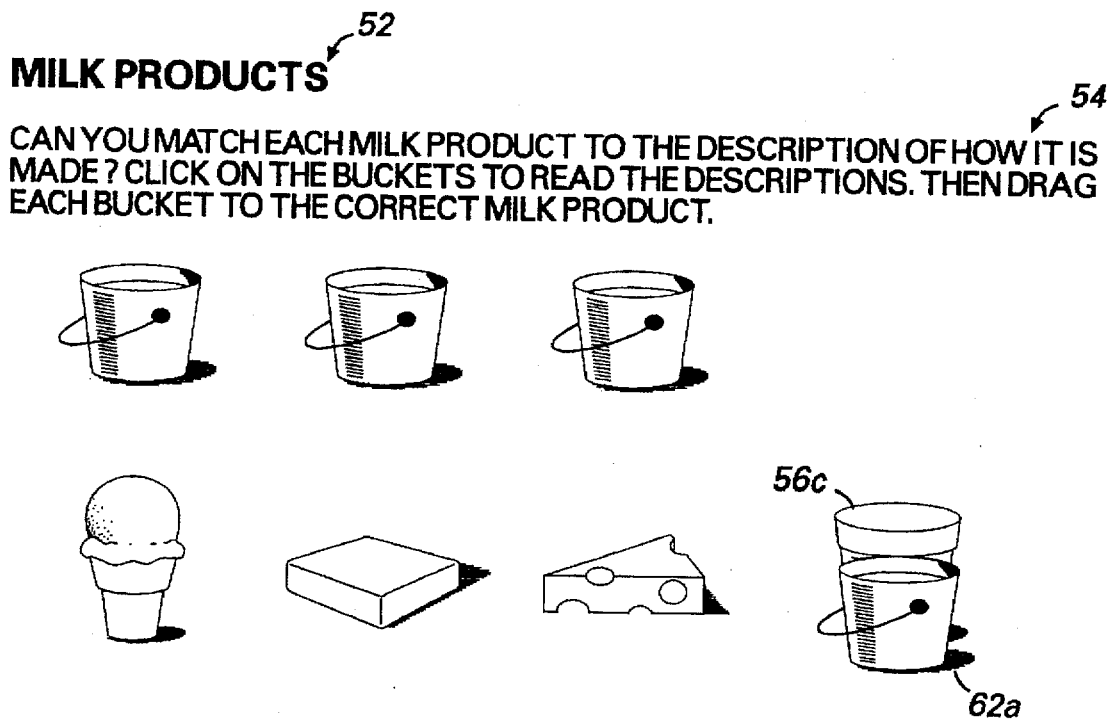

FIGS. 4A–4H illustrate screen displays of the exemplary question-answer session shown in FIG. 2, and further illustrate the preferred embodiment of the present invention. Taken together, the illustrated screen displays show the dragging of a bucket to cover a milk product at an initial position, and the depiction of the bucket springing back to its resting position from that initial position. In particular, FIG. 4A illustrates the selected bucket 62a in its resting position aligned with the other buckets 56a–60a. A user clicks on bucket 62a and drags it along a travel path illustrated by arrow 64 towards the yogurt milk product 56c. FIG. 4B illustrates that the user has dragged the bucket 62a to cover the yogurt milk product 56c. However, pursuant to the program, the match of the bucket 62a to the yogurt 56c is incorrect. Thus, the bucket 62a does not snap into place over the yogurt 56a. Rather, the bucket 62a springs from its initial position over the yogurt 56c in a series of bounces on a travel path away from the bucket's initial position over the yogurt 56c towards the bucket's resting position with the other buckets 56a–60a. In the preferred embodiment, the bucket springs back from the initial position to oscillate about and ultimately rest at the resting position. This series of bounces is illustrated in FIGS. 4C–4H.

Figure 4C:
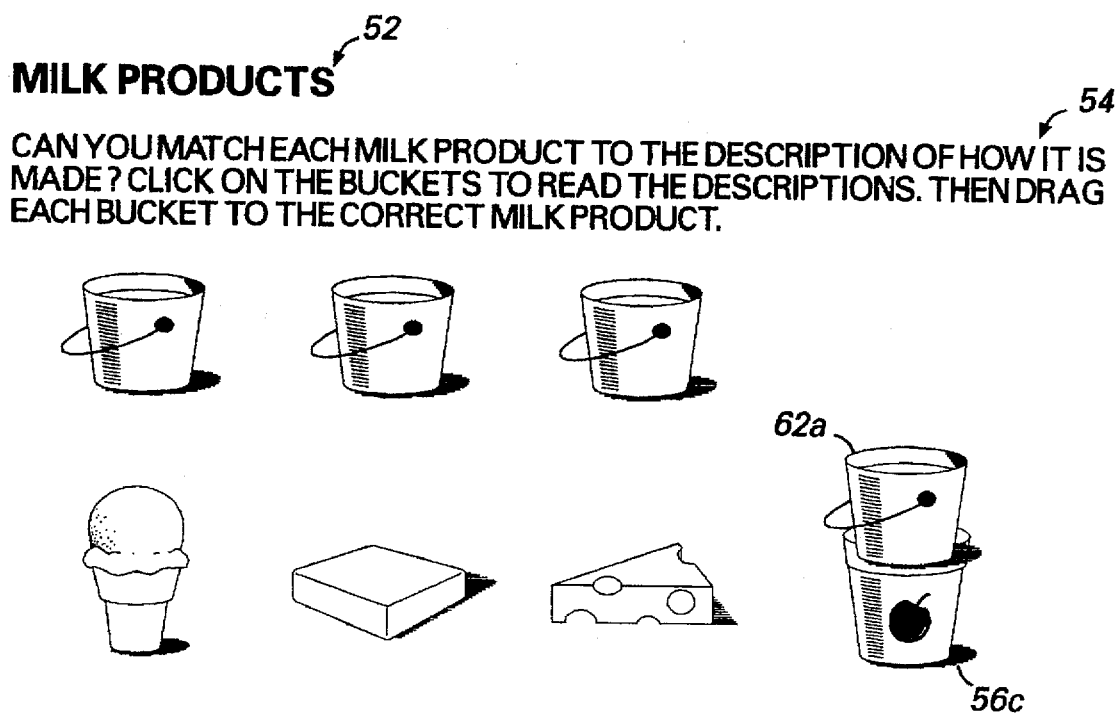

FIG. 4C illustrates the bucket 62a in its first bounce position on the travel path away from the initial position over yogurt 56c and towards the resting position with the other buckets 56–60a. The preferred embodiment's determination of a bounce position is discussed in detail in connection with FIGS. 5 and 6 below. Further, it should be noted that the bucket 62a is depicted in the first bounce position only after a predetermined time interval has passed since the display of the object in the initial position. In other words, a preferred time interval has to pass after the user mismatches the incorrect answer to the question before the object (in this case, a bucket) appears in the first bounce position. Preferably, this time interval is 1/30th of a second so that the depiction of the springing object appears as a smooth movement on the display screen to the user. Also, it should be noted that in the preferred embodiment, the object is not displayed in the first bounce position until the display of the object in the initial position has been erased. As illustrated in FIG. 4C, the display of the bucket 62a covering the yogurt 56c has been erased prior to the display of the bucket 62a in the first bounce position.

Figure 4D:
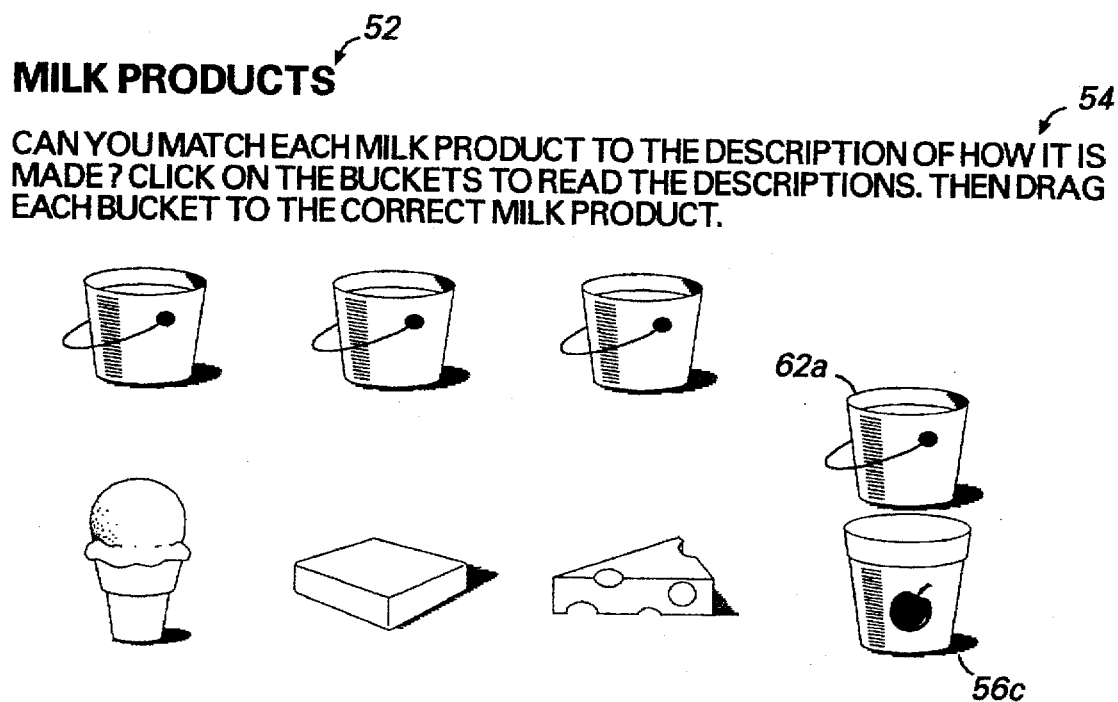
Figure 4E:
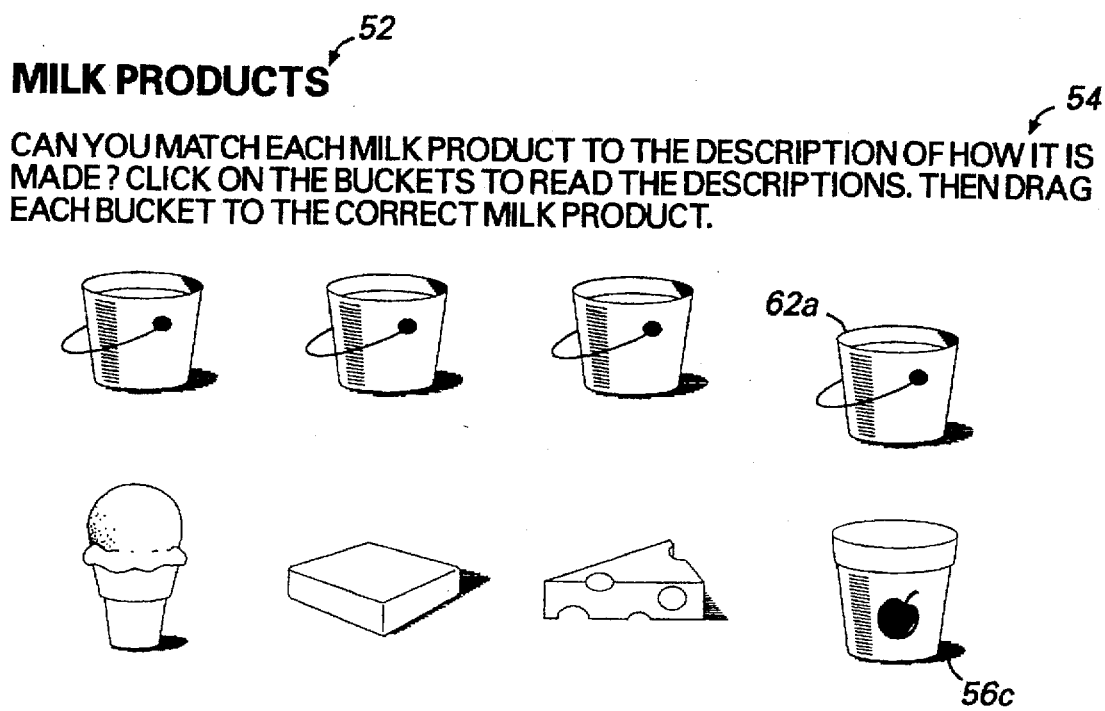
Figure 4F:
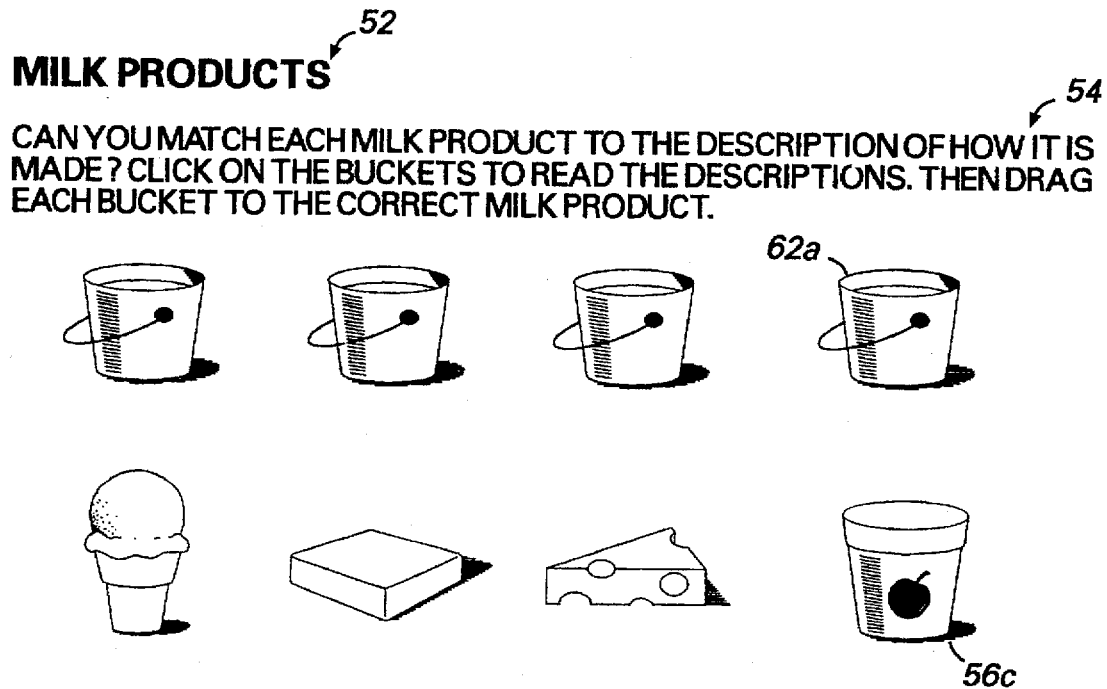

FIGS. 4D–F illustrate respectively the bucket 62a in a second, third and fourth bounce position on the travel path away from the bucket's initial position over yogurt 56c and towards the bucket's resting position with the other buckets 56–60a. As noted, the preferred embodiment's determination of a bounce position is discussed in detail in connection with FIGS. 5 and 6 below. Further, it should be noted that the bucket 62a is depicted in the respective successive bounce positions only after a predetermined time interval has passed since the display of the object in the previous bounce position. In other words, a preferred time interval has to pass after the object appears in a bounce position before the object appears in a successive bounce position. Preferably, this time interval is 1/30th of a second so that the depiction of the bouncing object appears as a smooth movement on the display screen to the user. Also, it should be noted that in the preferred embodiment, the object is not displayed in the successive bounce position until the display of the object in the previous bounce position has been erased. As illustrated in FIG. 4D–F, the display of the bucket 62a in the previous bounce position has been erased prior to the display of the bucket 62a in the bounce position in the respective FIGS. 4D–F.

Figure 4G:
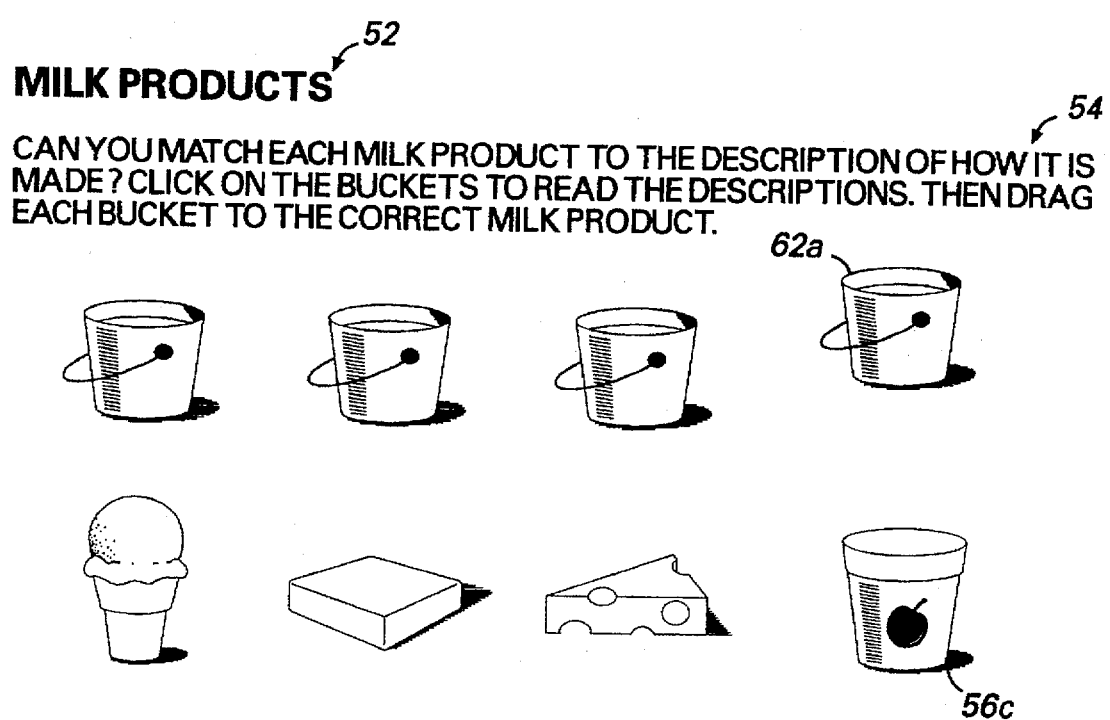

FIG. 4G illustrates the bucket 62a in a fifth bounce position. However, the fifth bounce has taken the bucket 62a past its resting position on the determined travel path such that the resting position lies between the fifth bounce position and the initial position. This is an example of an oscillation of the object about the resting position. With the next bounce, the object moves back towards its resting position in a travel path opposite to the previous path of travel to the fifth bounce position. The depiction of the oscillations of the object more closely parallels the motion of the snap back snap back of an extended spring, thereby augmenting the educational and entertainment experience of the person using the program.

Figure 4H:
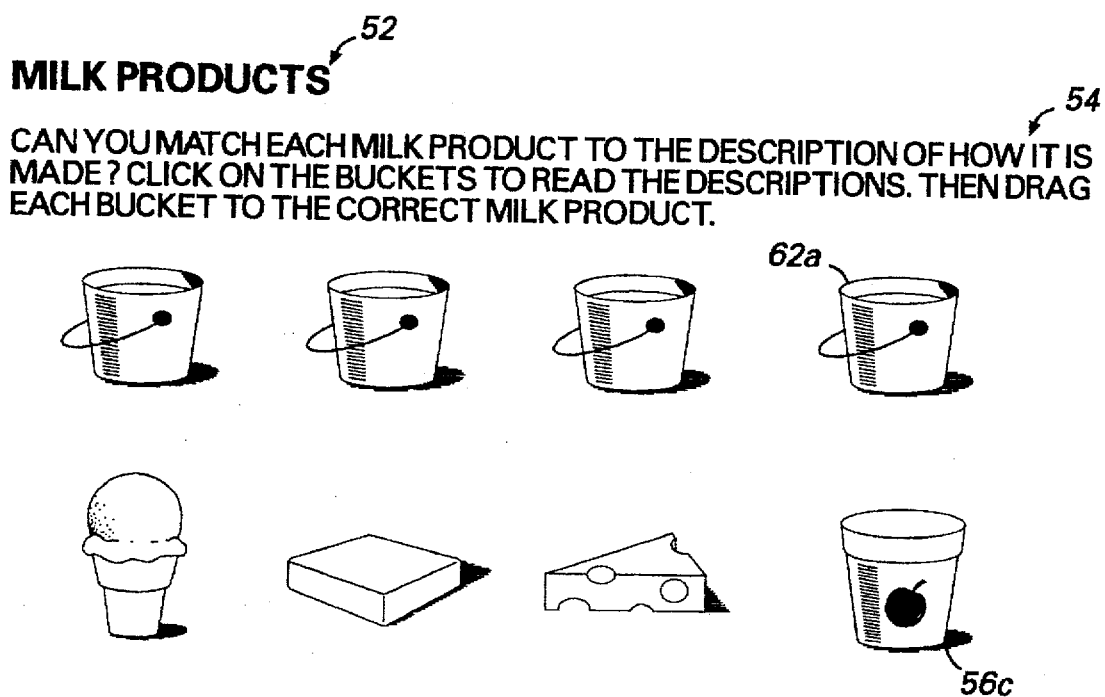

FIG. 4H illustrates the bucket 62a in its resting position. Pursuant to the preferred embodiment, the object does not continue its oscillations about the resting position endlessly. Rather, once the object is displayed in a bounce position that is within a predetermined distance of the resting position and the velocity of the object towards the resting position drops below a predetermined value, then the object is displayed in the resting position.

Although FIGS. 4A–H have illustrated five bounces of the bucket 62a with little oscillation to the bucket's ultimate rest in the resting position with the other buckets 56a–60a, it will be apparent to those skilled in the art that more or fewer bounces (and more or fewer oscillating bounces) of an object may be depicted to simulate the spring back of an extended spring associated with an object such as bucket 62a from an initial position to a resting position.

It is further noted that the depiction of an object springing back from an initial position may be interrupted by a user during the process of such depiction. In particular, if a signal is received to interrupt the depiction of the springing object, the object then is displayed in the resting position. Typically, the interrupt signal corresponds to a signal provided by the user of the program such as a mouse click, or other input signal.

Prior to a discussion of the operation of the preferred embodiment using flow diagrams, by way of introduction we briefly review the well known principal interactions between the application program 28 (FIG. 1) and operating system 16 that are relevant to the present invention. The referenced primary interactions include the timer and drawing operations. With respect to timer operations, the timer is a resource of the operating system 16 that measures a specific interval in milliseconds. The application 28 checks this time repeatedly, waiting for a predetermined period of time to elapse. This period of time is 1/30th of a second (33 milliseconds) in the preferred embodiment.

With respect to drawing operations, the application program 28 conducts drawing operations by using functions of the operating system 16 to set the drawing mode and the pen attributes of the operating system 16. With those resources set, the application program 28 draws images directly to the monitor 40.

As noted above, the preferred operating system 16 is the "WINDOWS" operating system of Microsoft Corporation. Further information regarding the "WINDOWS" operating system and its interaction with application programs is available from a variety of publications, including the Guide to Programming, which is part of the Microsoft Windows Software Development Kit (published by Microsoft), the Win32 Programmer's Reference (published by Microsoft Press), and Programming Windows 3.1 (published by Microsoft Press), all of which are incorporated herein by reference. Additional information regarding the "MICROSOFF EXPLORAPEDIA" application program is available from the documentation distributed with Version 1.1. This documentation is incorporated herein by reference.

Figure 5:
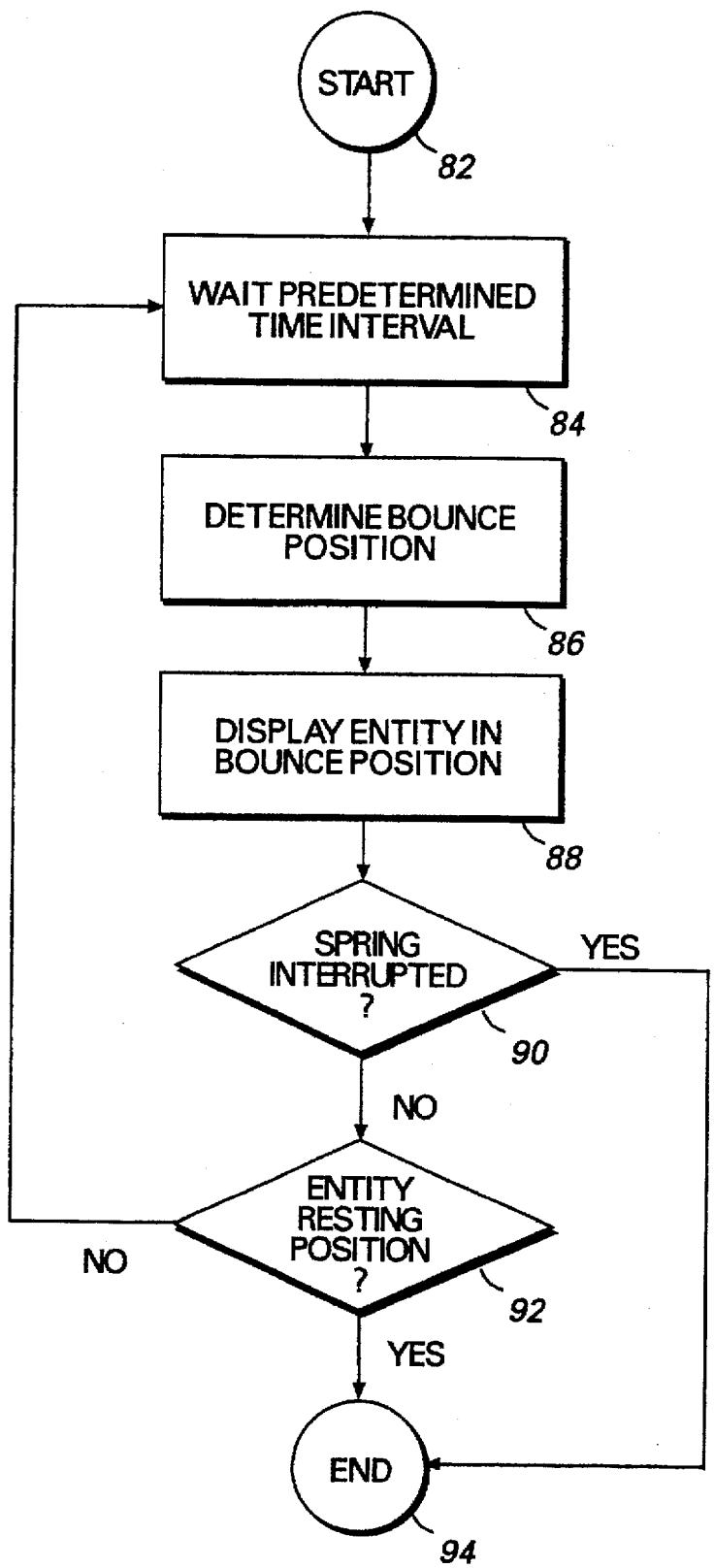
FIG. 5 is a logical flow diagram of the process implemented by an application program for displaying an object springing back in accordance with the preferred embodiment of the present invention.

FIG. 5 is a logical flow diagram of the process implemented by an application program for displaying an object springing back in accordance with the preferred embodiment of the present invention. The object is displayed as part of a graphical user interface. An "object" is defined as a drawing element such as a line or an arc, or a shape (such as the bucket 62a) that can be saved and manipulated as a unit and that can usually be categorized by the way it is created. As a precursor to the springing process, some event transpires during the course of the application program to trigger the springing process. In the context of the example described in FIGS. 3–4, such an event may be the mismatch of an answer to a question in an educational or entertainment program. The "Milk Products" example will be continued to be used by way of explanation without limitation thereto. Other triggering events will readily occur to those skilled in the art. Typically, an object will have been moved from a resting position on the computer display screen to a different position. It is from this different position that the spring back of the object begins, and thus, the different position is referred to herein as the "initial" position.

As shown in FIG. 5, the method and system of the preferred embodiment of the spring back process begin at start step 82 and proceed to step 84 wherein the spring back process waits a predetermined time interval. In particular, a timer is created and set preferably to 1/30th of a second. The timer provides a delay for that period following the triggering of the spring back process and the display of the object in the first bounce position. The time interval provides for smooth flow of the animation.

After the wait step 84, in step 86 the bounce position for the object is determined. Further details regarding the determination of the bounce position are provided below in connection with FIGS. 6 and 7.

After determination of the bounce position, in step 88 the spring back process displays the object in the bounce position. Preferably, the process will have erased the display of the object in the initial position prior to the display of the object in the bounce position. More particularly described, the preferred spring back process erases the display of the object in the initial position in a manner well known to those skilled in the art by calling an operating system routine to invalidate the display of the object in the initial position. The preferred spring back process displays the object in the bounce position also in a manner well known to those skilled in the art by calling an operating system routine and providing the operating system with information so that the object may be displayed in the bounce position.

Still referring to FIG. 5, in decision step 90 the process checks whether the spring back depiction is to be interrupted. An interruption may be indicated by a signal that corresponds to user input such as a mouse click. If the spring back depiction is to be interrupted, then the process proceeds to end step 94. More particularly, if a signal is received to interrupt the depiction of the springing object, the object then is displayed in the resting position. If the spring back depiction is to continue, then in decision step 92 the process checks whether the spring back is to be terminated. In particular, in step 92 the process checks whether the object is within a predetermined distance of the resting position, and whether the velocity of the object towards the resting position has dropped below a predetermined value. If the discontinue spring back condition is satisfied, then the process proceeds to end step 94. Preferably, the object then is displayed in the resting position. If the discontinue spring back condition is unsatisfied, then the process repeats the above-described steps beginning with wait step 84. However, it will be apparent that the repetition differs from the original process in that the steps are carried out with respect to a subsequent bounce position (rather than the first) of the object.

To summarize the spring back process as illustrated in FIG. 5, the process is initiated (start step 82) and waits a predetermined interval (wait step 84). Thereafter, the bounce position for the object is determined (step 86), and the object is displayed in the bounce position (step 88). A check is made to determine whether the spring back process is to be interrupted (step 90). If the process is to be interrupted, the process ends (step 94). If the process is not to be interrupted, then a check is made whether the object may be displayed in the resting position (step 92). If so, the process ends (step 94). If not, the process repeats beginning with the waiting interval (step 84).

As noted above, further details are provided herein regarding the determination of one or more bounce positions for the object. In the preferred embodiment, the bounce positions of the object are determined so as to best reflect a spring back motion for the object. Thus, the preferred embodiment takes into account the path of travel of the object during the spring back motion and the object's apparent velocity towards a resting position. The path of travel is defined as a vector P and is further defined as the vector from the object's "current" position to its resting position. The object's velocity towards its resting position is based in part on the vector P as well as on the previous velocity (if any) of the object towards its resting position, and on an elasticity constant and a damping constant. The constants are used to best simulate a springing motion. The elasticity constant affects the speed of the object in accelerating towards the resting position. In the preferred embodiment, an elasticity constant of 0.1 is used. The damping constant affects the speed of the object in coming to rest due to simulated frictional losses, and in particular, affects the number of times the object appears to oscillate about the resting position prior to being displayed in the resting position. In the preferred embodiment, a damping constant of 0.9 is used.

The preferred embodiment uses these referenced factors in the following formula to determine each bounce position of the object:

$$\text{Bounce Position} = [\text{Previous bounce (or initial) position}] + \left[ \left[ \left( \begin{array}{c} \text{Previous} \\ \text{Velocity} \\ \text{Vector} \end{array} \right) + \left( \begin{array}{c} \text{Resting} \\ \text{Position} \end{array} \right) - \left( \begin{array}{c} \text{Previous} \\ \text{bounce} \\ \text{(or initial)} \\ \text{position} \end{array} \right) \right] * \text{Elasticity Constant} \right] * \text{Damping Constant}$$

For each bounce position, the above formula is re-used, but with new values to reflect the motion of the object towards its resting position. In the preferred embodiment, the values are based on a two dimensional, floating point coordinate system.

By way of further explanation, the above described formula may be handled in parts. For example, for each bounce position the preferred embodiment determines the vector P (path of travel) based on the object's current position and its resting position. This vector P then is used to determine the velocity vector applicable to that particular bounce position. Once the velocity vector is determined, then the bounce position is determined to be the previous bounce position offset by the velocity vector. If the bounce determination relates to the first bounce position, then the first bounce position is determined to be the initial bounce position offset by the velocity vector. Also, if the bounce determination relates to the first bounce position, then the preferred embodiment ascribes a value of "0" to the previous velocity vector. The preferred determination of the vector P, the velocity vector and the bounce position are summarized below:

| | | |
|---|---|---|
| Vector P | - | vector from object's current position to its resting position |
| Velocity vector towards resting position | = | [V + (P*Elasticity constant)]* Damping constant |
| Bounce position | - | previous position offset by velocity vector |

In sum, the effect of using this basis of bounce position determination is the depiction of the object bouncing from the initial position towards and bouncing about (oscillating) the resting position until the object appears to come to rest in the resting position.

A sample calculation of an exemplary display of an object from an initial position ($C_i$=(30,6)) to a resting position ($C_r$=(10,6)) through six bounce positions is summarized in the table below and illustrated in FIG. 6. Only six bounce positions are illustrated for sake of brevity. As indicated by the ellipses, the object would appear in more bounce positions until the object is within a predetermined distance of the resting position, and the velocity of the object towards the resting position has dropped below a predetermined value. In this sample calculation and in the preferred embodiment, the initial position ($C_i$) of the object is defined to be the position at which the user released the object after dragging it to the location. Referring to the Milk Products example again, the initial position of bucket 62a is the position over the yogurt to which the user dragged and released the bucket 62a. Other definitions for an initial position will be apparent to those skilled in the art. Referring again to the sample calculation below, the initial velocity vector has been ascribed a value of (0,0). Thus, the motion of the object follows a straight line course from its initial position, through the illustrated six bounce positions and to its resting position.

TABLE

Figure 6:
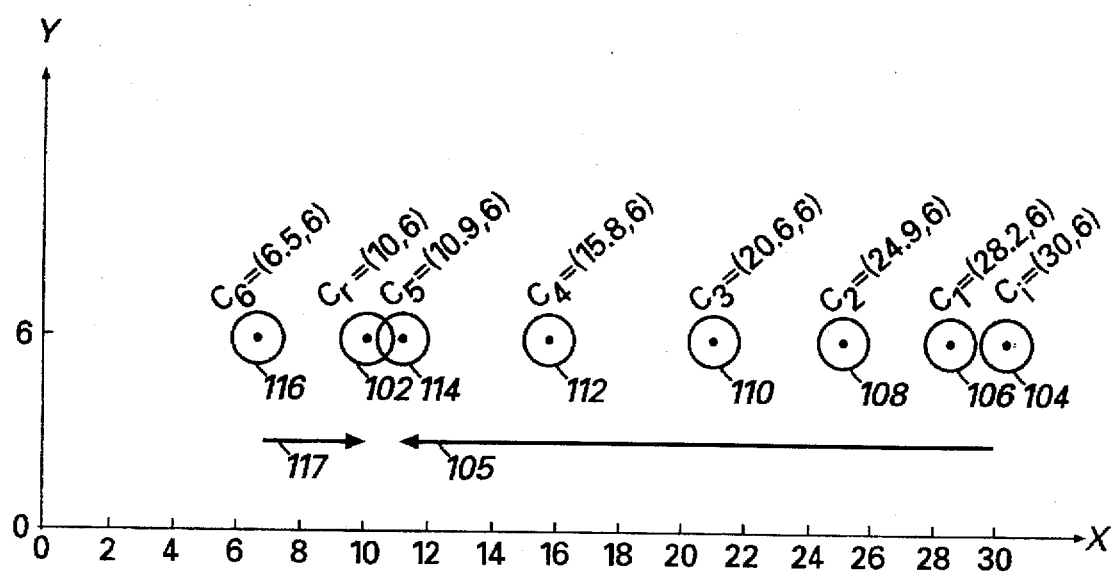
FIG. 6 is a graph that illustrates exemplary bounce positions of an object along a particular travel path in accordance with the preferred embodiment of the present invention.

| Position of Object | C | C(x,y) | P(x,y) | V(x,y) | FIG. 6 |
|---|---|---|---|---|---|
| Initial position | $C_i$ | (30, 6) | | | 104 |
| First bounce | C1 | (28.2, 6) | (−20, 0) | (−1.8, 0) | 106 |
| Second bounce | C2 | (24.9, 6) | (−18.2, 0) | (−3.3, 0) | 108 |
| Third bounce | C3 | (20.6, 6) | (−14.9, 0) | (−4.3, 0) | 110 |
| Fourth bounce | C4 | (15.8, 6) | (−10.6, 0) | (−4.8, 0) | 112 |
| Fifth bounce | C5 | (10.9, 6) | (−5.8, 0) | (−4.85, 0) | 114 |
| Sixth bounce | C6 | (6.5, 6) | (−0.9, 0) | (−4.45, 0) | 116 |
| . | . | . | . | . | . |
| . | . | . | . | . | . |
| . | . | . | . | . | . |
| Resting position | $C_r$ | (10, 6) | | | 102 |

As noted in the discussion of the overall operation of the present invention, the process continues to determine bounce positions and to display the object in those bounce positions until the user interrupts the process by some signal such as clicking the mouse, or until the object is within a predetermined distance of the resting position, and the velocity of the object towards the resting position has dropped below a predetermined value. In the preferred embodiment, the process determines that the object is close enough to its resting position to stop the bounces when the value of the vector P is equal to or less than (0.5,0.5) (in cartesian coordinates) In other words, the object stops bouncing when there is virtually no apparent difference in distance between the previous bounce position and the resting position of the object. Further, in the preferred embodiment, the process determines that the object has slowed down enough to stop the bounces when the value of the vector V is equal to or less than (0.5, 0.5) (in cartesian coordinates). In other words, the object stops bouncing when there is no more motion towards the resting position.

Figure 7:
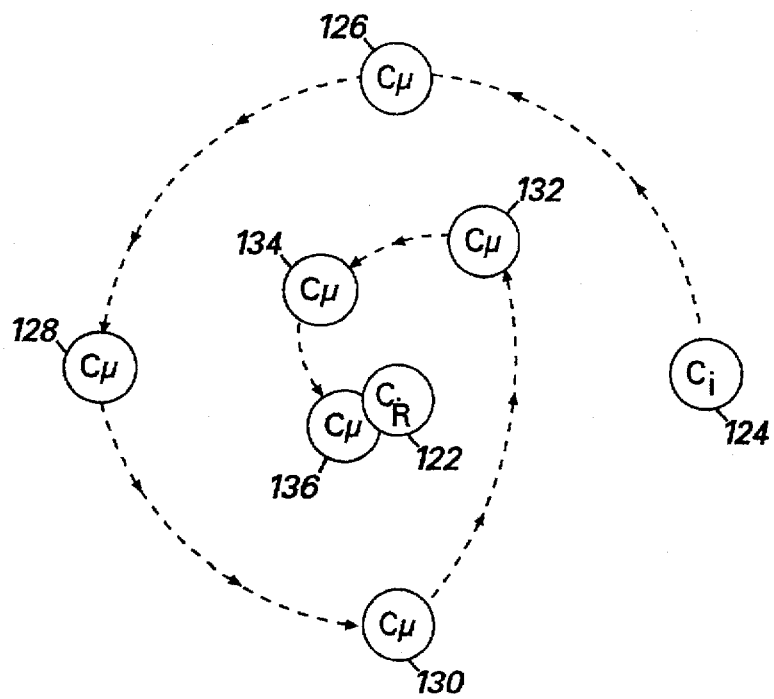
FIG. 7 also is a graph that illustrates exemplary bounce positions of an object along a different particular travel path in accordance with the preferred embodiment of the present invention.

In the sample calculation provided above, it was noted that the initial velocity vector was ascribed a value of (0,0). In an alternate embodiment, the present invention includes a value for the initial velocity vector so as to better simulate the spiral motion of a spring in returning to its resting position. The value for the initial velocity vector used in this alternate embodiment is based on the user's interaction with the program. As noted, the initial position is defined to be the position at which the user released the object after dragging it to the location. In this alternate embodiment, the process notes the position and direction of the cursor (as directed by a mouse or other input device) immediately prior to the release of the object at the initial position ("immediately prior position"). The velocity vector between the initial position and the immediately prior position in the direction of the initial position is defined to be the initial velocity vector. This initial velocity vector then is used in the determination of the first bounce position. The inclusion of a velocity vector in the determination of the first bounce position generally adds a two dimensional effect to the determination of the bounce positions. In other words, the bounce positions are not strung out linearly. This lack of linearity results in an overall spiral effect to the depiction of the object springing back from an initial position. FIG. 7 illustrates exemplary bounces of an object that provide a spiral effect in the depiction of the object springing back from an initial position.

Those skilled in the art will understand that the various steps of the present invention include other error branches that cause the method to abort if an error condition such as a lack of free memory exists in the computer system 12. Such error branches are well known in the art and are not directly related to the present invention. Accordingly, they will not be further described.

From the foregoing description of the preferred embodiment and the several alternatives, other alternative constructions of the present invention may suggest themselves to those skilled in the art. Therefore, the scope of the present invention is to be limited only to the claims below and the equivalents thereof.

What is claimed is:

1. A method for depicting an object springing back from an initial position to oscillate about and ultimately rest in a resting position, comprising the steps of:

(a) displaying the object in the initial position;

(b) determining a bounce position for the object;

(c) displaying the object in the bounce position;

(d) noting that the bounce position of the object is within a predetermined distance of the resting position and that the velocity of the object towards the resting position is less than a predetermined value; and (e) in response to the step of noting, displaying the object in the resting position.

2. The method of claim 1, wherein the step of determining the bounce position comprises determining the bounce position based on the initial position of the object.

3. The method of claim 1, wherein the step of displaying the object comprises displaying the object in the bounce position after a predetermined time interval, the predetermined time interval calculated from the display of the object in the initial position.

4. The method of claim 1, wherein the step of displaying the object in the bounce position comprises erasing the display of the object in the initial position prior to displaying the object in the bounce position.

5. The method of claim 1, wherein the step of determining the bounce position comprises determining a travel path for the object from the initial position towards the resting position.

6. The method of claim 1 further comprising the steps of:

(f) receiving a signal to interrupt the depiction of the springing object; and (g) in response to receiving the signal, displaying the object in the resting position.

7. A method for depicting an object bouncing along a travel path from an initial position of the object towards a resting position of the object, comprising the steps of:

(a) selecting the travel path for the object from the initial position towards the resting position;

(b) determining a first bounce position on the travel path for the object;

(c) after a first time interval, displaying the object in the first bounce position;

(d) determining a second bounce position on the travel path for the object, the second bounce position being closer to the resting position along the travel path than the first bounce position; and (e) after a second time interval, displaying the object in the second bounce position.

8. The method of claim 7, wherein the step of determining the first bounce position comprises determining the first bounce position based on the initial position of the object.

9. The method of claim 7, wherein the step of determining the second bounce position comprises determining the second bounce position based on the first position of the object.

10. The method of claim 7 further comprising the steps of:

receiving a signal to interrupt the depiction of the bouncing object; and in response to receiving the signal, displaying the object in the resting position.

11. A method for depicting an object springing back along a travel path from an initial position to oscillate about and ultimately rest at a resting position, comprising the steps of:

(a) selecting the travel path for the object towards the resting position;

(b) determining a bounce position on the travel path for the object;

(c) after a time interval, displaying the object in the bounce position;

(d) determining a subsequent bounce position on the travel path for the object;

(e) after a subsequent time interval, displaying the object in the subsequent bounce position; and repeating steps (d)–(e) until the subsequent bounce position is within a predetermined distance from the resting position, and then displaying the object in the resting position.

12. The method of claim 11, wherein each subsequent bounce position is closer to the resting position than a previous bounce position, and wherein the step of displaying the object in the subsequent bounce position comprises displaying the object in each subsequent bounce position such that the object is displayed closer to the resting position than the object was displayed in the previous bounce position.

13. The method of claim 11, wherein the step of determining the subsequent bounce position comprises determining the subsequent bounce position based on the initial bounce position of the object.

14. The method of claim 11, wherein the step of determining the subsequent bounce position comprises determining the subsequent bounce position based on an immediately previous bounce position of the object.

15. The method of claim 11 further comprising the steps of:

receiving a signal to interrupt the depiction of the springing object; and in response to receiving the signal, displaying the object in the resting position.

16. A system for depicting on a computer screen an object springing back along a travel path from an initial position to oscillate about and ultimately rest at a resting position, comprising:

a graphical user interface for display on the computer screen;

means for selecting a travel path for the object towards the resting position;

means for determining a bounce position on the travel path for the object; and means for displaying the object as part of the graphical user interface, the display means displaying the object in the initial position, and after a time interval of display of the object in the initial position, the display means being responsive to the selection means and bounce determination means for displaying the object in the bounce position.

17. A computer-readable medium on which is stored a computer program for depicting on a computer screen an object springing back along a travel path from an initial position to oscillate about and ultimately rest at a resting position, said computer program comprising instructions, which when executed by a computer, perform the steps of:

(a) displaying the object in the initial position;

(b) determining a bounce position for the object;

(c) displaying the object in the bounce position;

(d) noting that the bounce position of the object is within a predetermined distance of the resting position and that the velocity of the object towards the resting position is less than a predetermined value; and (e) in response to the step of noting, displaying the object in the resting position.

* * * * *